(12) United States Patent
Shima et al.

(10) Patent No.: US 11,444,486 B2
(45) Date of Patent: Sep. 13, 2022

(54) WIRELESS POWER FEEDING DEVICE

(71) Applicant: Faurecia Clarion Electronics Co., Ltd., Saitama (JP)

(72) Inventors: Kazuaki Shima, Saitama (JP); Tamaki Goto, Saitama (JP)

(73) Assignee: Faurecia Clarion Electronics Co., Ltd., Saitama (JP)

(*) Notice: Subject to any disclaimer, the term of this patent is extended or adjusted under 35 U.S.C. 154(b) by 0 days.

(21) Appl. No.: 17/392,390

(22) Filed: Aug. 3, 2021

(65) Prior Publication Data

US 2022/0060051 A1 Feb. 24, 2022

(30) Foreign Application Priority Data

Aug. 21, 2020 (JP) .............................. JP2020-139772

(51) Int. Cl.
| | |
|---|---|
| *H02J 50/10* | (2016.01) |
| *H01F 27/28* | (2006.01) |
| *H01F 38/14* | (2006.01) |
| *H01F 27/29* | (2006.01) |
| *H02J 50/00* | (2016.01) |

(52) U.S. Cl.
CPC ........ *H02J 50/005* (2020.01); *H01F 27/2852* (2013.01); *H01F 27/292* (2013.01); *H01F 38/14* (2013.01); *H02J 50/10* (2016.02); *H01F 2027/295* (2013.01); *H02J 2310/22* (2020.01)

(58) Field of Classification Search
CPC ...... H02J 50/005; H02J 50/10; H02J 2310/22; H02J 50/20; H02J 50/001; H01F 27/2852; H01F 27/292; H01F 38/14; H01F 2027/295; H01R 2201/26; H01R 13/703; H01R 13/625

See application file for complete search history.

(56) References Cited

U.S. PATENT DOCUMENTS

| | | | | |
|---|---|---|---|---|
| 2010/0207835 | A1* | 8/2010 | Taura | H01Q 13/10 |
| | | | | 343/770 |
| 2010/0220838 | A1* | 9/2010 | Kobayashi | F16M 11/105 |
| | | | | 378/189 |

(Continued)

FOREIGN PATENT DOCUMENTS

JP          3203152 U    3/2016

*Primary Examiner* — Lincoln D Donovan
*Assistant Examiner* — Alex W Lam
(74) *Attorney, Agent, or Firm* — IP Business Solutions, LLC

(57) ABSTRACT

A wireless power feeding device includes an attachment member having a socket to be electrically connected to a power supply and a fastener to be electrically connected to a ground, and a band having a socket pin to be inserted to the socket and a locking tool to be locked to the fastener, the band being attached to the attachment member and fixing a power receiving device to which power is to be wirelessly fed to the attachment member, wherein the socket pin has a power feeding electrode to be electrically connected to the power supply within the socket, and a ground connection sensing electrode to be electrically connected to the ground via the locking tool and the fastener, and the attachment member has a switch circuit electrically connecting the power supply to the power feeding electrode only when the ground connection sensing electrode is electrically connected to the ground.

6 Claims, 9 Drawing Sheets

(56) References Cited

U.S. PATENT DOCUMENTS

2015/0214752 A1* 7/2015 Gluzman ............... H02J 50/70
                                                    307/104
2016/0322851 A1   11/2016 Yeh et al.
2016/0331989 A1* 11/2016 Cho ..................... A61N 1/326

* cited by examiner

FIG.8
| | SOCKET PIN | INSERTION OPENING | ELECTRODE ARRANGEMENT EXAMPLE 1 | ELECTRODE ARRANGEMENT EXAMPLE 2 |
|---|---|---|---|---|
| ASPECT 1 | 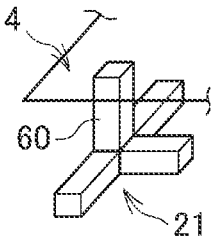 | 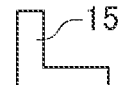 | 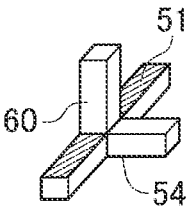 | 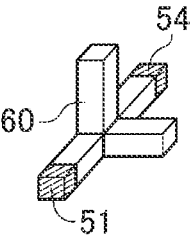 |
| ASPECT 2 | 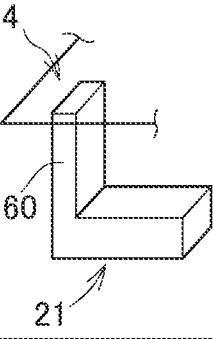 | 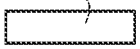 | 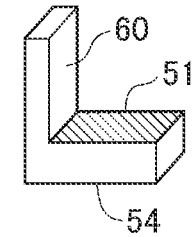 | 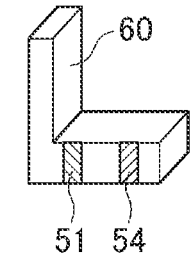 |
| ASPECT 3 | 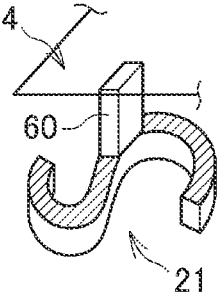 |  | 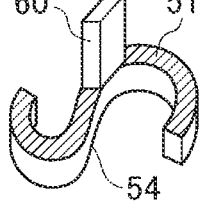 | 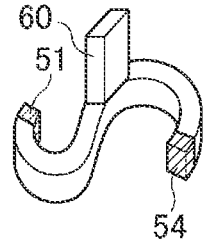 |
| ASPECT 4 | 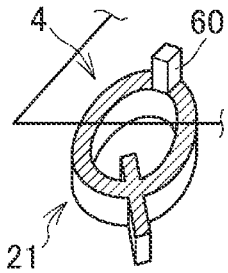 | 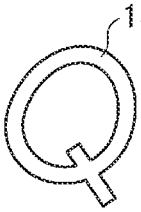 | 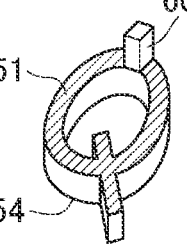 | 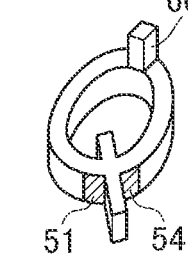 |

WIRELESS POWER FEEDING DEVICE

INCORPORATION BY REFERENCE

The present application claims priority under 35 U.S.C. § 119 to Japanese Patent Application No. 2020-139772 filed on Aug. 21, 2020. The content of the application is incorporated herein by reference in its entirety.

BACKGROUND OF THE INVENTION

Field of the Invention

The present invention relates to a wireless power feeding device.

Description of the Related Art

As a related art of the present invention, Japanese Utility Model Laid-Open No. 3203152 (hereinafter, called Patent Literature 1) is disclosed. The section "Problem to be Solved" in the abstract of Patent Literature 1 has a description "a hanging flexible wireless power charging device is provided which has a flexible and slim structure". The section "Solution" in the abstract has a description "A wireless power charging device 3 includes a flexible supporting member 30, a thin-film transmission coil assembly, and a hanging element 33. The flexible supporting member 30 includes a main supporting part 301 and a sub supporting part 302. The sub supporting part 302 is connected to the main supporting part 301, and pockets 303 are thus defined along with the main supporting part 301 and the sub supporting part 302. Each of the pockets 303 has an inlet 304 and an accommodating space 305. The thin-film transmission coil assembly is disposed within the main supporting part 301 and radiates electromagnetic waves having a specific frequency so that a power receiving device A within the accommodating space 305 of the pocket 303 can be charged. The hanging element is connected to the main supporting part. The flexible supporting member is hung from a target via the hanging element."

In Patent Literature 1, among the pockets provided in advance, there may be no pocket having a size suitable for a power receiving device. Also, for example, there is a possibility that, when some vibrations are transmitted to the flexible supporting member, a power receiving device moves within the pocket and charging thereof is influenced.

It is an object of the present invention to provide a wireless power feeding device that can charge a power receiving device more properly.

SUMMARY OF THE INVENTION

One aspect of the present invention is a wireless power feeding device including an attachment member having a socket to be electrically connected to a power supply and a fastener to be electrically connected to a ground, and a band having a socket pin to be inserted to the socket and a locking tool to be locked to the fastener, the band being removably attached to the attachment member by inserting the socket pin and locking the locking tool and fixing a power receiving device to which power is to be wirelessly fed to the attachment member, wherein the socket pin has a power feeding electrode to be electrically connected to the power supply within the socket, and a ground connection sensing electrode to be electrically connected to the ground via the locking tool and the fastener, and the attachment member has a switch circuit that electrically connects the power supply to the power feeding electrode and energizes a power feeding unit that wirelessly feeds power to the power receiving device only when the ground connection sensing electrode of the socket pin inserted to the socket is electrically connected to the ground.

According to one aspect of the present invention, a power receiving device can be charged more properly.

BRIEF DESCRIPTION OF THE DRAWINGS

FIGS. 4A and 4B roughly show a structure of a socket, in which FIG. 4A is a plan view and FIG. 4B is a cross-sectional view taken at line I-I in FIG. 4A;

FIG. 8 shows shapes of socket pins and insertion openings according to variation examples of the present invention along with arrangement examples of electrodes in the socket pins.

DETAILED DESCRIPTION OF THE PREFERRED EMBODIMENT

An embodiment of the present invention is described below with reference to drawings.

Figure 1:
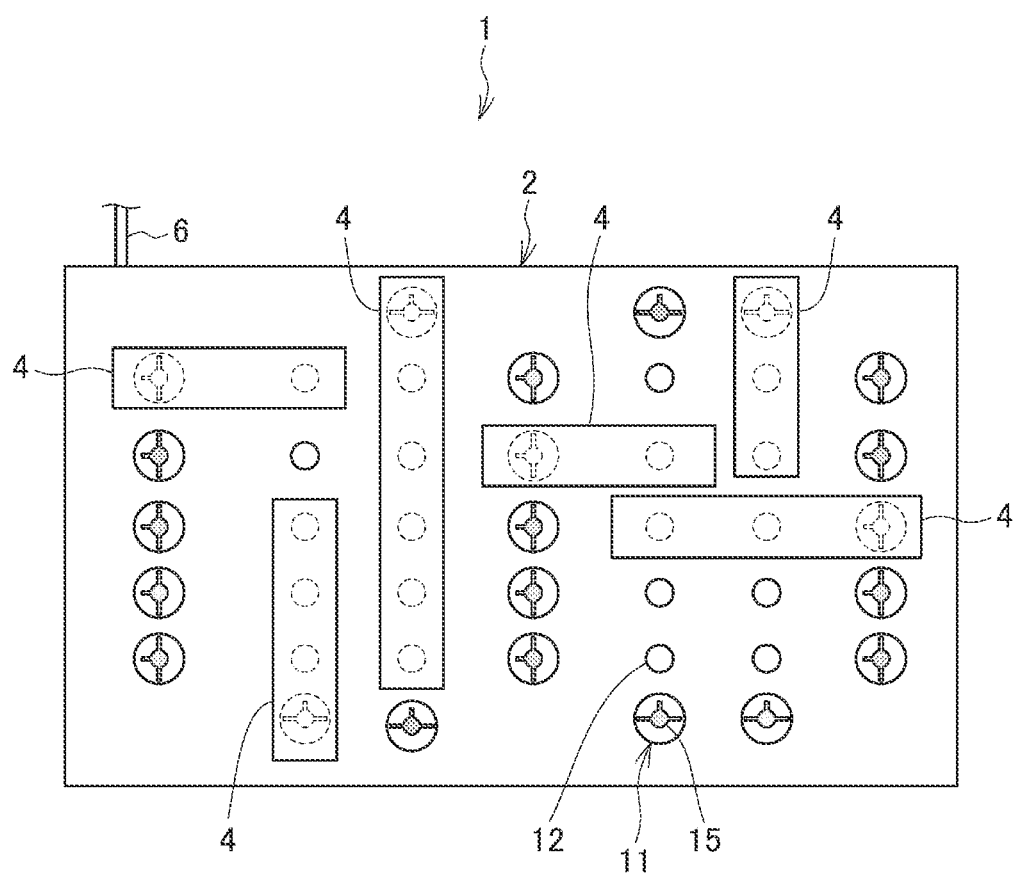
FIG. 1 is a plan view schematically showing a configuration of a removable wireless power feeding device according to an embodiment of the present invention.

FIG. 1 is a plan view schematically showing a configuration of a removable wireless power feeding device 1 according to an embodiment.

The removable wireless power feeding device 1 is a device including a plate-like attachment board 2, and a plurality of strip-shaped bands 4 that are removably attached to the attachment board 2, in which each of the bands 4 fixes a power receiving device A (FIG. 3) to the attachment board 2, and power is wirelessly fed from the band 4 to the power receiving device A.

The attachment board 2 includes a power supply cable 6, and the power supply cable 6 is connected to a vehicle power port that is a supply port of a power supply E (FIG. 5) included in a vehicle. The attachment board 2 is attached to an appropriate member such as a sun visor provided in the interior of the vehicle by using an appropriate fixture.

Also, many sockets 11 and fasteners 12 are provided on a surface of the attachment board 2.

Figure 5:
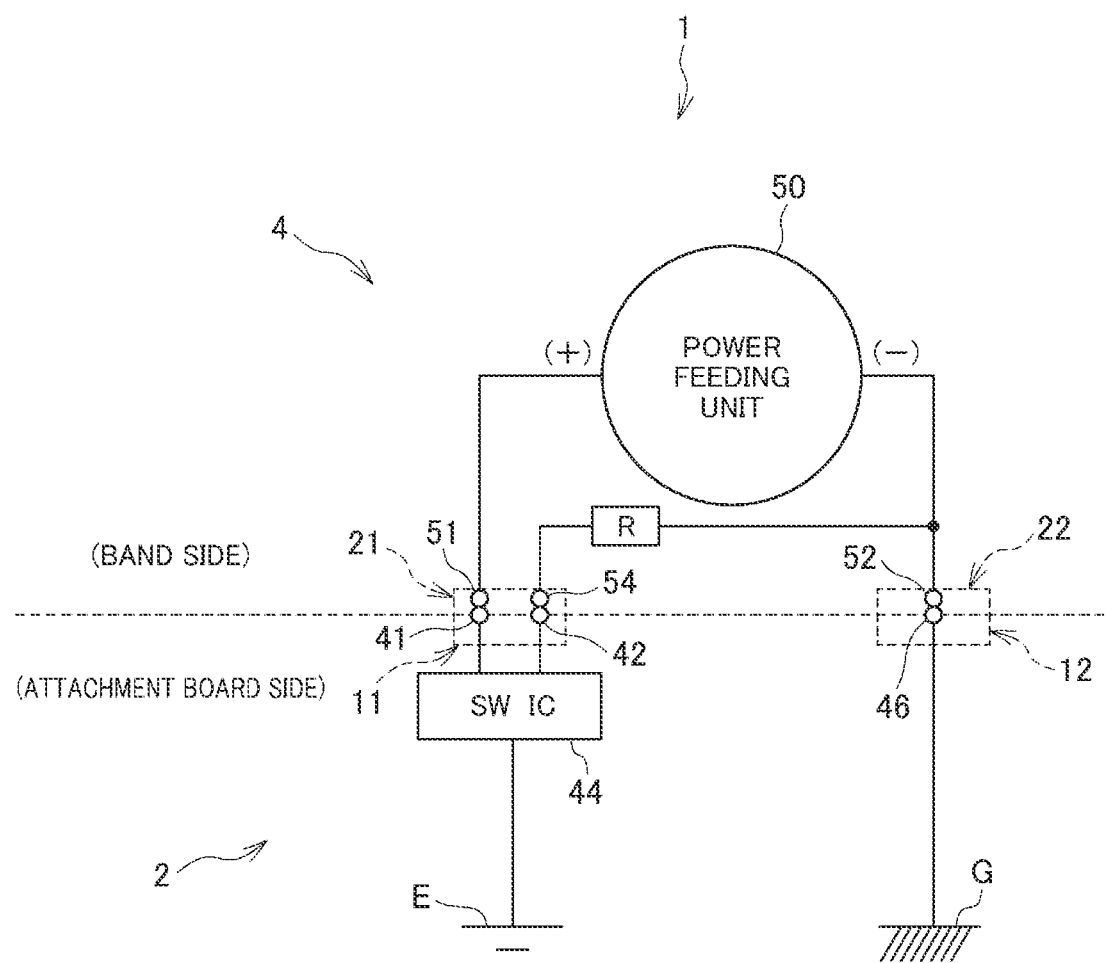
FIG. 5 shows an electric configuration of the removable wireless power feeding device.

The sockets 11 and the fasteners 12 function as members (fasteners) that fix the bands 4 to the attachment board 2. According to this embodiment, these sockets 11 and fasteners 12 configure electrical contacts for feeding power to the bands 4. Specifically, the sockets 11 are configured as high-potential-side contacts by being electrically connected to the power supply E of the vehicle, and the fasteners 12 are configured as low-potential-side contacts by being electrically connected to a ground G (FIG. 5). As the fasteners 12, metallic snap fasteners electrically connected to the ground G are used.

It should be noted that the sockets 11 are described later. The number and positions of the sockets 11 and fasteners 12 on the attachment board 2 are arbitrary.

Figure 2:
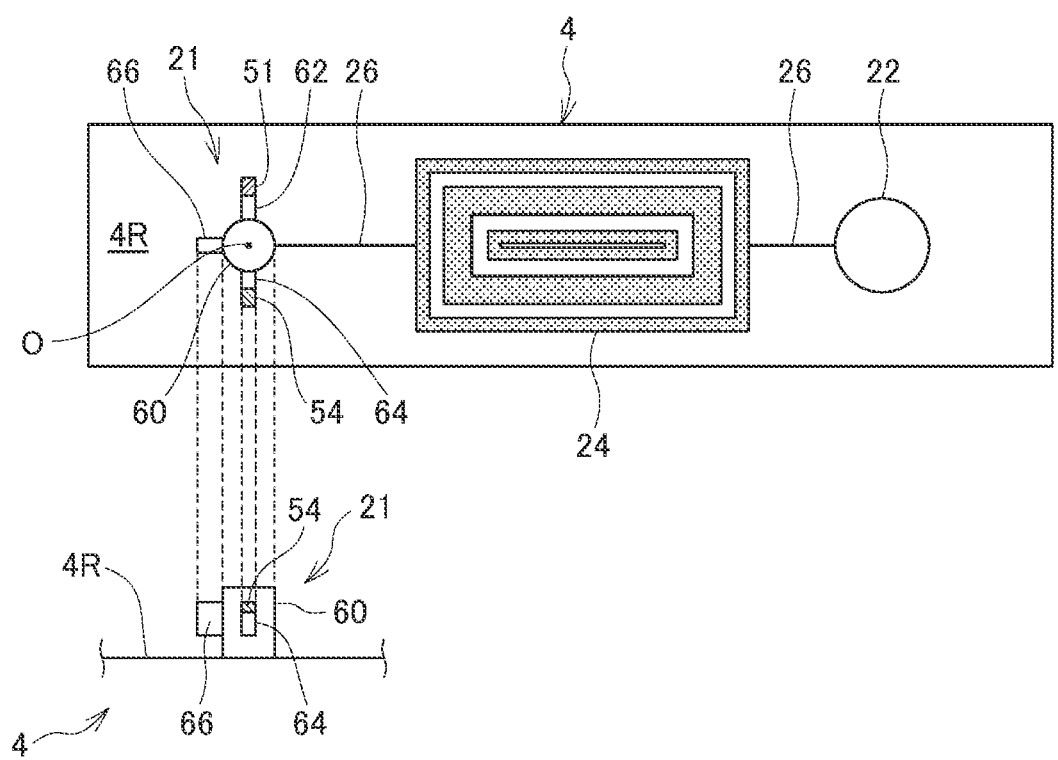
FIG. 2 is a plan view schematically showing a back surface side of a band.

FIG. 2 is a plan view schematically showing a side having a back surface 4R of the band 4.

The band 4 is a strip-shaped rubber band that is stretchable because of its elasticity. Also, the band 4 has, on the back surface 4R, a pair of a socket pin 21 and a locking tool 22 and a power feeding coil 24 for wireless power feeding.

The socket pin 21 is a member that is inserted to an insertion opening 15 of the socket 11 and is electrically connected to the power supply E within the socket 11.

The locking tool 22 is a metallic member that is locked to the fastener 12 on the attachment board 2 and is electrically connected to the ground G via the fastener 12. As such a locking tool 22, a metallic snap fastener to be fitted into the fastener 12 is used.

The power feeding coil 24 is disposed between the socket pin 21 and the locking tool 22 and is electrically connected to the socket pin 21 and the locking tool 22 via an electric wire 26.

Figure 3:
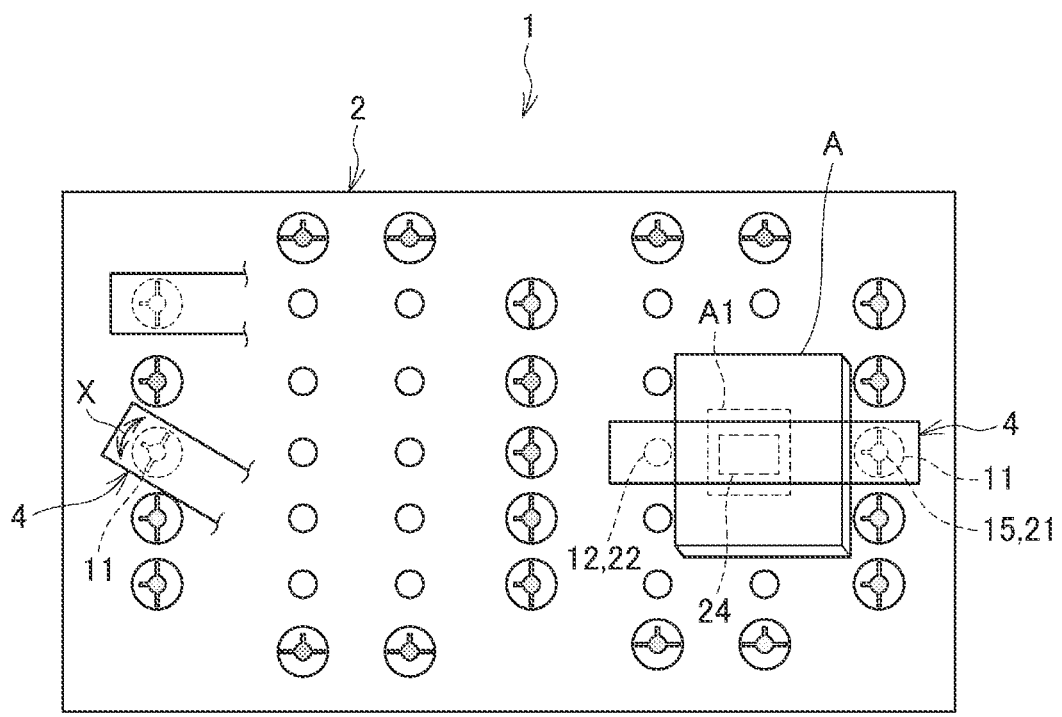
FIG. 3 is a schematic diagram showing an attachment aspect of the band and a power receiving device to an attachment board.

The socket pin 21 is inserted and fixed to the socket 11 on the attachment board 2 and the locking tool 22 is locked (fastened) into the fastener 12 so that the band 4 described above is removably attached to the attachment board 2. In this case, as shown in FIG. 3, by sandwiching a power receiving device A between the band 4 and the attachment board 2, the power receiving device A is fixed onto the attachment board 2. The power receiving device A is fixed with the band 4 such that the power feeding coil 24 covers a power receiving unit A1 of the power receiving device A, and charging by wireless power feeding from the power feeding coil 24 to the power receiving device A is thus efficiently performed.

It should be noted that the power receiving device A is an appropriate electronic device having the power receiving unit A1 that receives power wirelessly fed from the power feeding coil 24. Examples of the power receiving device A include a smartphone and a tablet personal computer (PC).

As shown in FIG. 1 described above, in the removable wireless power feeding device 1, because many sockets 11 and fasteners 12 are provided on the attachment board 2, a user can fix the power feeding device A with the band 4 by using the socket 11 and the fastener 12 at a desired position. Also, in the removable wireless power feeding device 1, because a plurality of bands 4 having different lengths can be provided at arbitrary positions, power receiving devices A having various sizes can be fixed tightly to the attachment board 2 by using the bands 4 having lengths depending on the sizes of the power receiving devices A. Also, because the band 4 is a stretchable rubber band, the power receiving device A can be rigidly fastened, and, even when vibrations of, for example, a vehicle in which the removable wireless power feeding device 1 is provided are transmitted to the power receiving device A, displacement of the power receiving device A can be suppressed, and charging thereto can be continued.

Figure 4A:
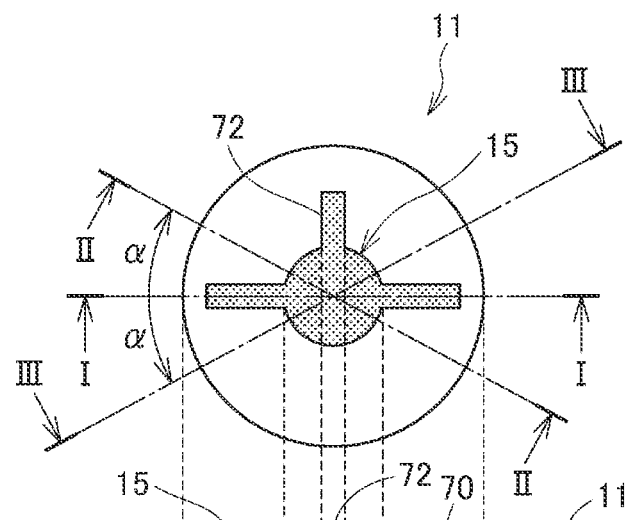
Figure 4B:
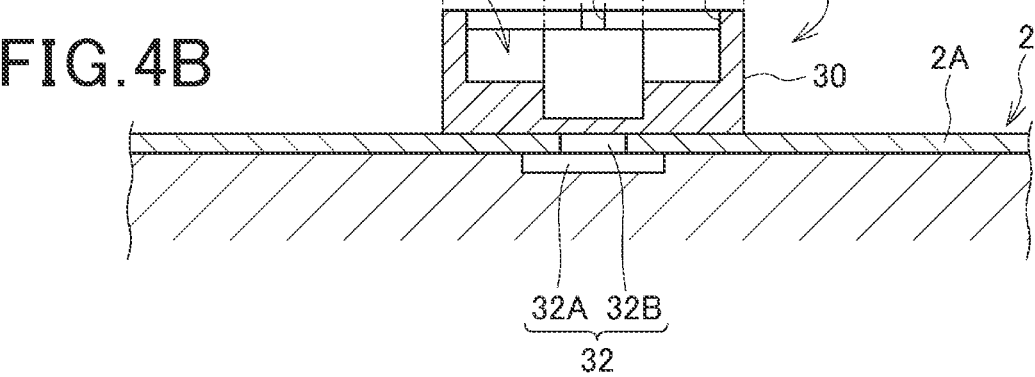

FIGS. 4A and 4B roughly show a structure of the socket 11. FIG. 4A is a plan view, and FIG. 4B is a cross-sectional view taken at line I-I in FIG. 4A.

The socket 11 has a socket body 30 having a substantially cylindrical shape and a fixture 32 that rotatably fixes the socket body 30 to a mounting material 2A of the attachment board 2. The fixture 32 has a plate-like head part 32A locked to a back surface side of the mounting material 2A and a columnar shank 32B that extends through the mounting material 2A to the front surface side and pivotably supports the socket body 30 and has a so-called rivet shape. The socket body 30 is fixed to the mounting material 2A with the fixture 32 so that the socket body 30 is pivotable about the shank 32B of the fixture 32.

Because the socket 11 is configured to be pivotable, a user can insert and fix the socket pin 21 of the band 4 to the socket 11 and then, as shown in FIG. 3 described above, rotate it about the socket 11 as indicated by the arrow X. Thus, the user can adjust the direction of extension of the band 4 to an appropriate direction in accordance with, for example, the shape and size of the power receiving device A and the attitude of the power receiving device A on the attachment board 2 and can tightly fix the power receiving device A at an arbitrary attitude.

By the way, in the removable wireless power feeding device 1, because the socket 11 being a high-potential-side contact and the fastener 12 being a contact of the ground G are provided on the surface of the attachment board 2, there is a possibility that a ground fault occurs in a case where a conductive member such as a metallic pin is brought into contact with the socket 11 and the fastener 12 if no measure is taken.

Accordingly, the removable wireless power feeding device 1 according to this embodiment is configured such that power of the power supply E is supplied from the socket 11 to the band 4 only when the socket pin 21 of the band 4 is inserted to the socket 11 and the locking tool 22 of the band 4 is fixed to the fastener 12 (that is, the locking tool 22 is electrically connected to the ground G).

With this configuration, even when the socket 11 and the fastener 12 are brought into conduction via, for example, a metallic pin, the power is not supplied from the socket 11, and a ground fault due to such conduction can be securely prevented.

Such a configuration is described below with reference to FIG. 5.

FIG. 5 shows an electrical configuration of the removable wireless power feeding device 1.

In the removable wireless power feeding device 1, the attachment board 2 has two independent output electrode 41 and switch control electrode 42 internally provided in the socket 11, a switch IC 44 to which those output electrode 41 and switch control electrode 42 are connected, and a ground electrode 46 provided in the fastener 12.

The switch IC 44 is a switch circuit that is connected to the power supply E of a vehicle and that opens and closes between the power supply E and the output electrode 41 in accordance with the potential state of the switch control electrode 42. Specifically, when the switch control electrode 42 has an open state (high impedance state), the switch IC 44 opens its switch to disconnect between the power supply E and the output electrode 41. On the other hand, when the control electrode 42 has a non-open state by, for example, being electrically connected to the ground G, the switch is closed to electrically connect between the power supply E and the output electrode 41.

The ground electrode 46 is an electrode that is connected to the ground G and is kept at a ground potential.

In the removable wireless power feeding device 1, the band 4 has a power feeding unit 50 that has the power feeding coil 24 and that wirelessly feeds power to the power receiving device A by energizing the power feeding coil 24, a power feeding electrode 51 that is connected to a high-potential side of the power feeding unit 50, a low-potential electrode 52 that is connected to a low-potential side of the power feeding unit 50, and a ground connection sensing electrode 54 that is connected to the low-potential electrode 52 via a protective resistance R.

The power feeding electrode 51 and the ground connection sensing electrode 54 are provided in the socket pin 21, and the power feeding electrode 51 is electrically connected to the power supply E via the output electrode 41 within the socket 11.

The low-potential electrode 52 is electrically connected to the locking tool 22. Thus, when the locking tool 22 is locked to the fastener 12 on the attachment board 2, both of the low-potential electrode 52 and the ground connection sensing electrode 54 connected to the low-potential electrode 52 are electrically connected to the ground G via the locking tool 22 and the fastener 12.

In such a configuration, when the socket pin 21 of the band 4 is inserted and fixed to the socket 11 of the attachment board 2 and the power feeding electrode 51 and the ground connection sensing electrode 54 of the socket pin 21 are brought into contact with the output electrode 41 and the switch control electrode 42 of the socket 11, respectively, the switch IC 44 on the attachment board 2 side connects or disconnects between the output electrode 41 and the power supply E based on the potential state of the switch control electrode 42, that is, the potential state of the ground connection sensing electrode 54.

In other words, only when the locking tool 22 of the band 4 is engaged with the fastener 12 of the attachment board 2 so that the ground connection sensing electrode 54 is electrically connected to the ground G, the switch IC 44 electrically connects between the output electrode 41 and the power supply E, and power is thus supplied from the output electrode 41 to the power feeding electrode 51 of the socket pin 21, which energizes the power feeding unit 50.

On the other hand, when the locking tool 22 is not engaged with the fastener 12 and the ground connection sensing electrode 54 has an open state, the switch IC 44 disconnects between the output electrode 41 and the power supply E to prevent the voltage of the power supply E from being applied to the output electrode 41 itself of the socket 11.

In this way, even when the socket pin 21 of the band 4 is inserted and fixed to the socket 11 of the attachment board 2, the power supply E is not connected to the socket 11 unless the locking tool 22 of the band 4 is connected to the ground G via the fastener 12.

Thus, the energization at a state that the band 4 is not properly fixed to the attachment board 2 can be securely prevented. Also, on the attachment board 2, because the power supply E is connected to the socket 11 only when the switch control electrode 42 of the socket 11 has a proper potential state (the non-open state in this embodiment), a ground fault can be prevented even when the socket 11 and the fastener 12 are brought into conduction via, for example, a metallic pin.

According to this embodiment, the engagement structure between the socket pin 21 and the socket 11 is a so-called turn-locking structure, and, after inserting the socket pin 21 to the insertion opening 15 of the socket 11, a user turns the socket pin 21 so that a state (lock state) is acquired in which the socket pin 21 is irremovably caught within the socket 11 and, in this state, the output electrode 41 and the power feeding electrode 51 and the switch control electrode 42 and the ground connection sensing electrode 54 are brought into contact and are connected.

In this case, if the ground connection sensing electrode 54 of the socket pin 21 is improperly connected (so-called reversely inserted) to the output electrode 41 of the socket 11, there is a possibility that the output electrode 41 connected to the power supply E is connected to the ground G through the ground connection sensing electrode 54 of the band 4 and a ground fault occurs.

Accordingly, in this embodiment, the socket 11 and the socket pin 21 have a structure that, when the socket pin 21 is inserted to the insertion opening 15 of the socket 11, the reverse insertion is prevented and the output electrode 41 and switch control electrode 42 of the socket 11 and the power feeding electrode 51 and ground connection sensing electrode 54 of the socket pin 21 are connected in appropriate combinations by themselves.

Specifically, as shown in the plan view in FIG. 2 described above, the socket pin 21 has a columnar insertion rod 60, a first bar part 62 and a second bar part 64 extending in a straight line in the mutually opposite directions from the insertion rod 60, and the power feeding electrode 51 is provided in the first bar part 62, and the ground connection sensing electrode 54 is provided in the second bar part 64. Furthermore, the socket pin 21 has a reverse-insertion preventing part 66.

In the socket pin 21, the part including the insertion rod 60, the first bar part 62 and the second bar part 64 has a rotation symmetric shape in which the part is symmetric even when it is rotated by 180 degrees about the insertion rod 60, in planer view shown in FIG. 2. The reverse-insertion preventing part 66 is a part that cancels the rotation symmetry of the socket pin 21. Specifically, the reverse-insertion preventing part 66 is a part having a rod-like shape extending from the insertion rod 60 in the direction (orthogonal direction in the shown example) intersecting the direction of extension of the first bar part 62 and the second bar part 64.

On the other hand, in the socket 11, the opening shape of the insertion opening 15 is substantially identical to the shape in planer view of the socket pin 21, as shown in FIGS. 4A and 4B described above.

Thus, when the socket pin 21 is reversely inserted to the insertion opening 15 of the socket 11, the reverse-insertion preventing part 66 is caught at the insertion opening 15 so that the insertion is inhibited. Therefore, the socket pin 21 is always inserted to the socket 11 in the fixed direction.

Next, the above-described turn-locking structure of the socket 11 and the socket pin 21 is described in detail.

Figure 6:
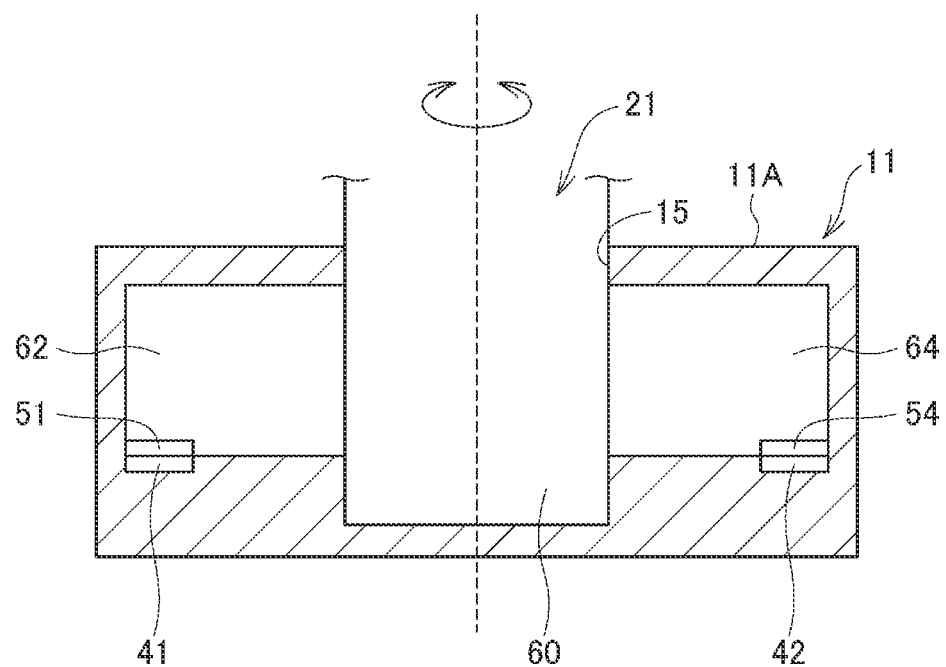
FIG. 6 is a cross-sectional view of the socket to which a socket pin is inserted, taken at line II-II in FIG. 4A.

FIG. 6 is a cross-sectional view of the socket 11 to which the socket pin 21 is inserted, taken at line II-II in FIG. 4A. The line II-II is a line acquired by rotating the line I-I by a predetermined angle α in a clockwise direction.

The internal part of the socket 11 has a space in which the inserted socket pin 21 can rotate by the predetermined angle α. Then, because of the shape having the first bar part 62, second bar part 64 and reverse-insertion preventing part 66 projecting radially from the outer circumference of the insertion rod 60, when the socket pin 21 rotates within the socket 11, those first bar part 62, second bar part 64 and reverse-insertion preventing part 66 are caught by an upper surface 11A inside the socket 11 as shown in FIG. 6 so that the socket pin 21 cannot be pulled out from the insertion opening 15.

In this way, the socket pin 21 that cannot be pulled out from the socket 11 enables the band 4 to be rigidly fixed to the attachment board 2.

It should be noted that the angle range in which the socket pin 21 inserted to the socket 11 can be rotated is provided on the inner surface of the socket 11, as shown in FIG. 4B, and can be controlled by the width in the circumferential direction (the direction around the rotational axis) of a concave part 70 into which the reverse-insertion preventing part 66 of the socket pin 21 enters.

Also, this embodiment is configured such that, when the socket pin 21 is rotated and cannot be pulled out from the socket 11, the socket pin 21 is electrically connected to the socket 11.

Specifically, as shown in FIG. 6, the output electrode 41 and the switch control electrode 42 are provided within the socket 11, and when the socket pin 21 is rotated by the predetermined angle α, those output electrode 41 and switch control electrode 42 are disposed at positions (the bottom surface of the internal part of the socket 11 in the shown example) where they are in contact with the power feeding electrode 51 in the first bar part 62 and the ground connection sensing electrode 54 in the second bar part 64.

Because of this configuration, those socket 11 and socket pin 21 are not electrically connected even when a user just inserts the socket pin 21 to the socket 11, but the socket pin 21 is electrically connected to the socket 11 only when the socket pin 21 cannot be pulled out from the socket 11 through the rotation of the socket pin 21, so that the removable wireless power feeding device 1 with high safety can be realized.

It should be noted that, in the internal part of the socket 11 of this embodiment, the output electrode 41 and the switch control electrode 42 are disposed also at positions (positions within the cross section taken at section line III-III in FIG. 4A) where the power feeding electrode 51 in the first bar part 62 and the ground connection sensing electrode 54 in the second bar part 64 are brought into contact with them when the socket pin 21 is rotated by the predetermined angle α in the counterclockwise direction instead of the clockwise direction. It should be noted that the cross-sectional configuration of the socket 11 at section line III-III is not shown because it is the same as the cross-sectional configuration taken at section line II-II (FIG. 6).

Because of such a configuration, a user can electrically connect the socket 11 and the socket pin 21 by rotating the socket pin 21 in either clockwise direction or counterclockwise direction, which can improve the usability.

According to the aforementioned embodiment, the following effects are provided.

The removable wireless power feeding device 1 according to this embodiment includes the attachment board 2 having the socket 11 to be electrically connected to the power supply E and the fastener 12 to be electrically connected to the ground G, and the band 4 having the socket pin 21 to be inserted to the socket 11 and the locking tool 22 to be locked to the fastener 12, the band 4 being removably attached to the attachment board 2 by inserting the socket pin 21 and locking the locking tool 22 and fixing the power receiving device A to which power is to be wirelessly fed onto the attachment member.

In the removable wireless power feeding device 1, the socket pin 21 has the power feeding electrode 51 to be electrically connected to the power supply E within the socket 11, and the ground connection sensing electrode 54 to be electrically connected to the ground G via the locking tool 22 and the fastener 12. Also, the attachment board 2 has the switch IC 44 that electrically connects the power supply E to the power feeding electrode 51 and energizes the power feeding unit 50 that wirelessly feeds power to the power receiving device A only when the ground connection sensing electrode 54 of the socket pin 21 inserted to the socket 11 is electrically connected to the ground G.

According to the aforementioned removable wireless power feeding device 1, because the switch IC 44 is provided, a short circuit due to foreign matter and unintended energization caused when, for example, the output electrode 41 is touched can be inhibited.

Also, because of the configuration in which the socket pin 21 is electrically connected to the power supply E within the socket 11, a user can be prevented from touching the electrical connection part (the output electrode 41 in this embodiment).

Also, because the power receiving device A is fixed to the attachment board 2 with the band 4, the power receiving device A can be easily fixed to the attachment board 2. Also, by using the band 4 having a length depending on the size of the power receiving device A, the power receiving device A can be tightly fixed such that the power receiving device A does not move against, for example, vibrations.

Also, according to the removable wireless power feeding device 1, even when the socket pin 21 of the band 4 is inserted and fixed to the socket 11 of the attachment board 2, the power supply E is not connected to the socket 11 unless the locking tool 22 of the band 4 is connected to the ground G via the fastener 12.

Thus, the energization in a state that the band 4 is not properly fixed to the attachment board 2 can be securely prevented. Also, on the attachment board 2, because the power supply E is connected to the socket 11 only when the switch control electrode 42 of the socket 11 is electrically connected to the ground G, a ground fault can be prevented even when the socket 11 and the fastener 12 are brought into conduction via, for example, a metallic pin.

In the aforementioned wireless power feeding device 1, the socket pin 21 has a shape to be irremovably caught within an internal part of the socket 11 when the socket pin 21 inserted to the socket 11 is rotated.

Thus, the coupling between the socket pin 21 and the socket 11 becomes rigid, and the attachment of the band 4 to the attachment board 2 becomes rigid.

In the aforementioned wireless power feeding device 1, the socket 11 has the output electrode 41 and the switch control electrode 42 being electrodes, at positions where the power feeding electrode 51 and the ground connection sensing electrode 54 are brought into contact with them when the socket pin 21 is irremovably caught, electrically connecting each of the power feeding electrode 51 and the ground connection sensing electrode 54 to the switch IC 44.

Thus, because the socket 11 and the socket pin 21 are not electrically connected even when a user just inserts the socket pin 21 to the socket 11 and because the socket pin 21 is electrically connected to the socket 11 by the switch IC 44 only when the socket pin 21 cannot be pulled out from the socket 11, the removable wireless power feeding device 1 with high safety can be realized.

In the aforementioned wireless power feeding device 1, the socket 11 has the output electrode 41 and the switch control electrode 42 at a position (a position within the section taken at line II-II in FIG. 4A) where the socket pin 21 is irremovably caught after being rotated in clockwise direction (normal direction) and a position where the socket pin 21 is irremovably caught after being rotated in the counterclockwise direction (opposite direction), respectively.

Thus, the socket 11 and the socket pin 21 can be electrically connected when a user rotates the socket pin 21 in either clockwise or counterclockwise direction, which can improve the usability.

In the aforementioned wireless power feeding device 1, the band 4 has stretchability.

Thus, the power receiving device A can be rigidly fastened, and, even when vibrations of a vehicle in which the attachment board 2 is fixed are transmitted to the power receiving device A, displacement of the power receiving device A can be suppressed, and charging thereto can be continued.

In the aforementioned wireless power feeding device 1, because the attachment board 2 has a plurality of the sockets 11 and a plurality of the fasteners 12, a user can select the socket 11 and the fastener 12 in accordance with the size and shape of the power receiving device A and the fixing position on the attachment board 2 to fix the power receiving device A with the band 4. Thus, the removable wireless power feeding device 1 with a significantly high degree of freedom relating to the size, shape and fixing position of the power receiving device A to which power is to be wirelessly fed can be acquired.

The aforementioned embodiment is merely an example of one aspect of the present invention, and variations and applications can be made arbitrarily without departing from the spirit and scope of the present invention.

Variation Example 1

In the aforementioned embodiment, the socket pin 21 has the reverse-insertion preventing part 66 so that the socket pin 21 is always inserted to the socket 11 in the fixed direction and that the power feeding electrode 51 and the ground connection sensing electrode 54 of the socket pin 21 and the output electrode 41 and the switch control electrode 42 within the socket 11 are connected in appropriate combinations.

However, without limiting to the configuration in which the socket pin 21 has the reverse-insertion preventing part 66, the power feeding electrode 51 and the ground connection sensing electrode 54 may be arranged in the socket pin 21 such that those power feeding electrode 51 and ground connection sensing electrode 54 are connected with the output electrode 41 and the switch control electrode 42 within the socket 11 always in the proper combinations and are prevented from being connected in wrong combinations (hereinafter, "reverse connection").

Figure 7:
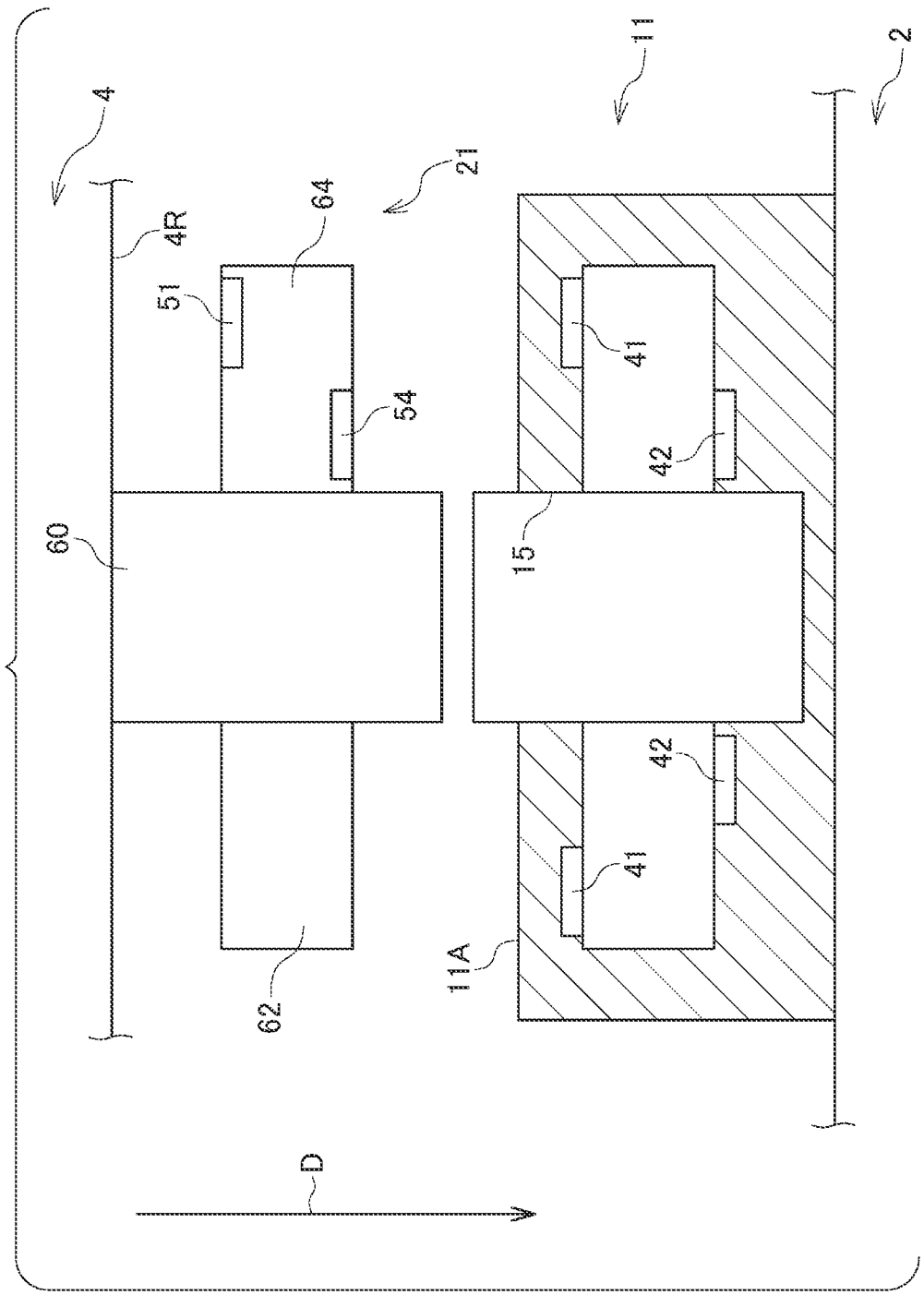
FIG. 7 shows an arrangement configuration of an electrode in a socket pin according to a variation example of the present invention.

For example, as shown in FIG. 7, the power feeding electrode 51 and the ground connection sensing electrode 54 are disposed so as not to overlap each other in the vertical direction D in FIG. 7 on an upper surface 64A and a lower surface 64B, respectively, of the second bar part 64 in the socket pin 21. On the other hand, in the internal part of the socket 11, the output electrode 41 and the switch control electrode 42 are disposed at positions where those power feeding electrode 51 and ground connection sensing electrode 54 are brought into contact with them (the upper surface and the bottom surface, respectively, in the internal part of the socket 11).

In this way, in the socket pin 21, because the power feeding electrode 51 and the ground connection sensing electrode 54 are disposed on the upper surface 64A and lower surface 64B of the second bar part 64, the power feeding electrode 51 and the ground connection sensing electrode 54 are connected to the output electrode 41 and the switch control electrode 42 always in the proper combinations even when the socket pin 21 having an attitude in which the first bar part 62 and the second bar part 64 are inverted in FIG. 7 is inserted to the socket 11, and the reverse connection is prevented.

Also, according to this variation example, in the internal part of the socket 11, the output electrode 41 and the switch control electrode 42 are disposed on both sides across the insertion rod 60 of the socket pin 21 so that the reverse connection can be prevented and, at the same time, the socket pin 21 can be connected to the power supply E even when the socket pin 21 is rotated in either right or left direction.

Variation Example 2

Arbitrary shapes can be adopted for the socket pin 21 and the insertion opening 15 of the socket 11 if the turn-locking structure can be constructed.

FIG. 8 shows aspect examples of the socket pin 21 and the insertion opening 15 according to this variation example.

As shown in FIG. 8, the socket pin 21 can have various shapes in which the distal end of the insertion rod 60 extending vertically from the back surface 4R of the band 4 has shapes in planer view such as a T-shape (Aspect 1), a straight-line shape (Aspect 2), an S-shape (Aspect 3), and a Q-shape (Aspect 4). In each of the aspects, the shape of the insertion opening 15 is substantially identical to the shape in planer view of the distal end of the socket pin 21. Also, in each of the aspects, the power feeding electrode 51 and the ground connection sensing electrode 54 may be arranged on the upper surface and the lower surface, respectively, of the shape of the distal end of the insertion rod 60 as shown in Electrode Arrangement Example 1 or may be arranged on a side surface or an end surface of the distal end of the insertion rod 60 as shown in Electrode Arrangement Example 2.

Variation Example 3

The band 4 may not be strip-shaped but may have a ring-like shape surrounding the power receiving device A.

Figure 9:
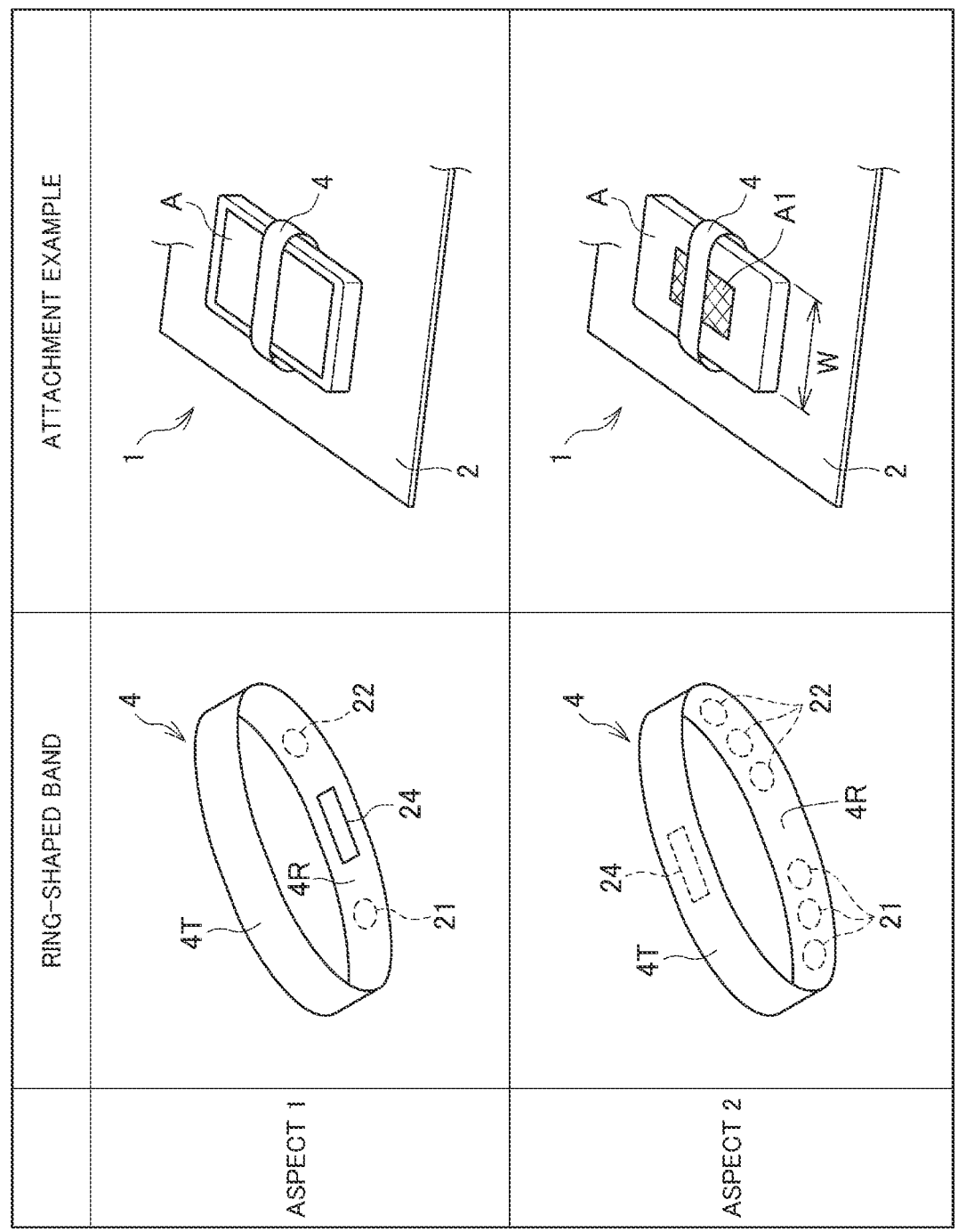
FIG. 9 shows aspects of bands according to variation examples of the present invention.

FIG. 9 shows aspect examples of the band 4 according to this variation example.

In a case where the band 4 has a ring-like shape, while the power feeding coil 24 is disposed on an inner surface 4R of the band 4, the socket pin 21 and the locking tool 22 are provided on an outer surface 4T of the band 4 as shown in Aspect 1 and Aspect 2. Thus, as shown in the attachment examples, the band 4 is wound around the power receiving device A, and the band 4 can be fixed to the attachment board 2 with the socket pin 21 and the locking tool 22 on the outer surface 4T.

Also, as shown in Aspect 2, a plurality of the socket pins 21 and a plurality of the locking tools 22 may be disposed at appropriate intervals in the circumferential direction of the band 4. Thus, the socket pin 21 and locking tool 22 to be used for attachment to the attachment board 2 can be selected in accordance with the lateral width of the power receiving device A, and the band 4 can be attached to the attachment board 2 with the band 4 wound around the power receiving device A without any gap.

Variation Example 4

The shape of the attachment board 2 is not limited to a plate-like shape, and the quality of material may be flexible. For example, the attachment member to which the band 4 is to be attached may be formed by providing the plurality of sockets 11 and the plurality of fasteners 12 on a surface of a member having a flexible material and covering a member (such as a seat within a vehicle) having some degree of rigidity.

OTHER VARIATION EXAMPLES

In the aforementioned embodiment, the power feeding coil 24 (power feeding unit 50) may be provided on the attachment board 2 (attachment member) instead of the band 4.

The removable wireless power feeding device 1 of the aforementioned embodiment may be installed and used at an appropriate position, without limiting to a vehicle.

In the aforementioned embodiment, the descriptions relating to directions such as horizontal and vertical directions and various numerical values and shapes do not exclude ranges around the directions, ranges around the numerical values and approximate shapes unless otherwise indicated. In other words, the directions, numerical values and shapes in the embodiment embrace ranges around the directions, ranges around the numerical values and approximate shapes (so-called range of equivalency) as far as they have the same operating effects as the directions, numerical values and shapes.

REFERENCE SIGNS LIST 1 removable wireless power feeding device (wireless power feeding device)
2 attachment board (attachment member)
4 band
11 socket
12 fastener
15 insertion opening
21 socket pin
22 locking tool
24 power feeding coil
41 output electrode
42 switch control electrode
44 switch IC (switch circuit)
46 ground electrode
50 power feeding unit
51 power feeding electrode
52 low-potential electrode
54 ground connection sensing electrode
66 reverse-insertion preventing part
A power receiving device
A1 power receiving unit
E power supply
G ground
α predetermined angle

What is claimed is:

1. A wireless power feeding device comprising:
an attachment member having a socket to be electrically connected to a power supply and a fastener to be electrically connected to a ground; and
a band having a socket pin to be inserted to the socket and a locking tool to be locked to the fastener, the band being removably attached to the attachment member by inserting the socket pin and locking the locking tool and fixing a power receiving device to which power is to be wirelessly fed to the attachment member, wherein
the socket pin has
a power feeding electrode to be electrically connected to the power supply within the socket; and
a ground connection sensing electrode to be electrically connected to the ground via the locking tool and the fastener, and
the attachment member has
a switch circuit that electrically connects the power supply to the power feeding electrode and energizes a power feeding unit that wirelessly feeds power to the power receiving device only when the ground connection sensing electrode of the socket pin inserted to the socket is electrically connected to the ground.

2. The wireless power feeding device according to claim 1, wherein
the socket pin has
a shape to be irremovably caught within an internal part of the socket when the socket pin inserted to the socket is rotated.

3. The wireless power feeding device according to claim 2, wherein
the socket has
electrodes, at positions where the power feeding electrode and the ground connection sensing electrode are brought into contact when the socket pin is rotated and is irremovably caught, for electrically connecting each of the power feeding electrode and the ground connection sensing electrode to the switch circuit.

4. The wireless power feeding device according to claim 3, wherein
the socket has
the electrodes for electrically connecting each of the power feeding electrode and the ground connection sensing electrode to the switch circuit at a position where the socket pin is irremovably caught after being rotated in a normal direction and a position where the socket pin is irremovably caught after being rotated in the opposite direction, respectively.

5. The wireless power feeding device according to claim 1, wherein the band has stretchability.

6. The wireless power feeding device according to claim 1, wherein
the attachment member has
a plurality of the sockets and a plurality of the fasteners.

* * * * *